(12) United States Patent
Passas et al.

(10) Patent No.: US 7,965,705 B2
(45) Date of Patent: Jun. 21, 2011

(54) FAST AND FAIR ARBITRATION ON A DATA LINK

(75) Inventors: Georgios A. Passas, Thassos (GR); Hans Eberle, Sunnyvale, CA (US); Nils Gura, Mountain View, CA (US); Wladyslaw Olesinski, Pleasanton, CA (US)

(73) Assignee: Oracle America, Inc., Redwood Shores, CA (US)

( * ) Notice: Subject to any disclaimer, the term of this patent is extended or adjusted under 35 U.S.C. 154(b) by 234 days.

(21) Appl. No.: 12/407,129

(22) Filed: Mar. 19, 2009

(65) Prior Publication Data
US 2010/0238949 A1 Sep. 23, 2010

(51) Int. Cl.
*H04L 12/28* (2006.01)
*H04L 12/50* (2006.01)

(52) U.S. Cl. ......... 370/359; 370/412; 370/419; 370/423

(58) Field of Classification Search .................. None
See application file for complete search history.

(56) References Cited

U.S. PATENT DOCUMENTS

| 6,687,246 | B1 * | 2/2004 | Wolrich et al. | 370/388 |
|---|---|---|---|---|
| 6,717,945 | B1 * | 4/2004 | Jue et al. | 370/392 |
| 6,999,413 | B2 * | 2/2006 | Moriwaki et al. | 370/228 |
| 7,023,844 | B2 * | 4/2006 | Wolrich et al. | 370/388 |
| 7,145,904 | B2 * | 12/2006 | Zhao et al. | 370/371 |
| 7,715,377 | B2 * | 5/2010 | Mick et al. | 370/371 |
| 7,774,374 | B1 * | 8/2010 | Kizhepat et al. | 707/800 |
| 2002/0057712 | A1 * | 5/2002 | Moriwaki et al. | 370/463 |
| 2003/0128703 | A1 * | 7/2003 | Zhao et al. | 370/392 |
| 2004/0017804 | A1 * | 1/2004 | Vishnu | 370/386 |
| 2007/0110087 | A1 * | 5/2007 | Abel et al. | 370/412 |
| 2008/0273546 | A1 * | 11/2008 | Johnson et al. | 370/419 |
| 2010/0272117 | A1 * | 10/2010 | Wu et al. | 370/413 |

* cited by examiner

*Primary Examiner* — Gregory B Sefcheck
(74) *Attorney, Agent, or Firm* — Park, Vaughan, Fleming & Dowler LLP; Steven E. Stupp (57) ABSTRACT

Embodiments of a circuit, a buffered crosspoint switch that includes the circuit and a computer system that includes the switch are described. In this circuit and switch, deep crosspoint buffers are replaced with smaller distributed buffers. This modification reduces the cost of the switch and improves the scaling properties of the architecture.

20 Claims, 9 Drawing Sheets

FAST AND FAIR ARBITRATION ON A DATA LINK

BACKGROUND

1. Field of the Invention

The present invention generally relates to switches and techniques for communicating signals through switches. More specifically, the present invention relates to the design of a port-sliced buffered crossbar switch.

2. Related Art

The crossbar is a popular switch topology. In order to set an unbuffered crossbar switch accordingly at the crosspoints, an arbiter is often used to match the crossbar input ports with the crossbar output ports. However, crossbar arbitration is computationally costly, especially for high port counts. In addition, unbuffered crossbars typically operate synchronously, which is difficult at high port counts.

For these reasons, switch designers often relax constraints by adding buffers at the crosspoints. By doing this, arbitration becomes much simpler because the crossbar arbiter can be replaced by decoupled crossbar input and output arbiters. A crossbar output arbiter polls the set of crosspoint buffers corresponding to the output and decides from which buffer the output reads. Similarly, a crossbar input arbiter polls the set of crosspoint buffers corresponding to the input and decides to which buffer the input writes. Furthermore, a buffered crossbar allows asynchronous operation, which is an attractive feature for high port counts and multi-chip-module (MCM) implementations.

The depth of a crosspoint buffer is determined by the delay of the path between this buffer and the associated input port. In an MCM crossbar switch, this delay can be significant because the path may cross multiple chip boundaries, thereby contributing multiple off-chip communication delays. Because of these high communication delays, an MCM buffered crossbar switch may end up using very deep buffers, which can significantly increase the switch cost as the memory size needed to implement the crosspoint buffers often dominates chip resources. Consequently, the memory size needed to implement the crosspoint buffers often dominates chip resources, thereby increasing switch cost or limiting port count scalability.

Hence, what is needed are buffered crossbar switches without the problems described above.

SUMMARY

One embodiment of the present invention provides a circuit that selectively couples input nodes to an output node. This circuit includes groups of input nodes that receive input signals; at least one unidirectional bus, having a scalable bus length, which is coupled to the output node; and buffers arranged along the bus. These buffers include chain buffers that buffer data signals on the bus and crosspoint buffers that buffer the input signals from the group of input nodes, where the depth of a given chain buffer is independent of the bus length. Moreover, arbiter circuits in the circuit are distributed along the bus, where a given arbiter circuit arbitrates between the data signals input to a given chain buffer and one or more of the input signals input to a given crosspoint buffer. Additionally, the circuit includes multiplexers, where a given multiplexer is coupled to a given chain buffer, a given crosspoint buffer and either the bus or, for a last multiplexer, the output node. Note that the given multiplexer selectively couples inputs to the given multiplexer, which include one or more of the input signals and data signals output from a chain buffer on the bus, to either a subsequent chain buffer on the bus or, for the last multiplexer on the bus, the output node.

One or more of the crosspoint buffers may receive two or more of the input signals from two or more input nodes in the group of input nodes.

Moreover, the circuit may comprise a switch that selectively couples input nodes to the output node.

In some embodiments, the circuit includes flow-control circuits, where a given flow-control circuit determines if one or more downstream buffers on the bus can accept data. Note that the depth of the given chain buffer corresponds to the length of segment of the bus which couples the given chain buffer to a preceding chain buffer, and flow-control information is sent from the given chain buffer to an arbiter associated with the preceding chain buffer that indicates whether the given chain buffer has space for additional data packets associated with the data signals.

This circuit may be implemented using multiple chips, and adjacent chips in the multiple chips may communicate via proximity communication. For example, the chain buffer and the preceding chain buffer may be located on different chips, and the segment of the bus may include a signal path external to the chips. Alternatively or additionally, a given chip may include a subset of the group of input nodes, the given chain buffer, the given crosspoint buffer, the given arbiter circuit and the given multiplexer. In some embodiments, the given arbiter circuit arbitrates between the subset of the group of input signals and data signals output from adjacent chips in the circuit.

Furthermore, the arbiter circuits may use a round-robin technique to ensure fairness between the inputs to the multiplexers. For example, the arbiter circuits may use a distributed weighted round-robin technique, where weights for a given flow through the circuit, which includes one or more of the input signals, are provided to the circuit.

Additionally, the given arbiter circuit may arbitrate between different data packets associated with the data signals in the given chain buffer and data packets associated with the one or more input signals in the given crosspoint buffer using virtual time stamps which determine the service virtual time of the different data packets on the bus. Note that a data packet with the earliest service virtual time may be forwarded first. These virtual time stamps may be computed locally on a given chip based on a given weight associated with the given flow through the circuit and a value of a local virtual-time clock. Moreover, the value of the local virtual-time clock may be updated according to virtual time stamps of data packets associated with the data signals that are received in a given chain buffer and data packets associated with the input signals that are received in the given crosspoint buffer.

Another embodiment provides a switch that includes the circuit. In this switch, one or more busses may communicate a full bisectional bandwidth of the switch, which includes a bandwidth associated with an aggregation of all of the input signals.

Another embodiment provides a computer system that includes the switch.

Another embodiment provides a method for communicating signals in the switch.

BRIEF DESCRIPTION OF THE FIGURES

Table 1 provides pseudo-code in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a port-sliced buffered crossbar switch that scales to hundreds of input and output ports and multi-terabit-per-second throughput utilizing proximity communication are described. Though attractive due to its simple and non-blocking operation, if the crossbar switch described here were implemented using conventional multiplexing of the crosspoint buffers, it would pose challenging buffer-space requirements due to its high port count and the relatively long off-chip communication latencies.

To address this challenge, hop-by-hop multiplexing of the crosspoint buffers is used. Furthermore, a distributed weighted round-robin arbitration technique that provides weighted fairness among flows is described. In addition to providing weighted fairness, this technique significantly reduces the required buffer depth, thereby eliminating one of the main obstacles in a high port-count multi-chip crossbar switch based on proximity communication MCM technology.

We now describe embodiments of the buffered crosspoint switch. Today's available integrated circuit packaging technology typically limits chip input/output bandwidth to about 1 Tb/s. In order to further increase the throughput and port count, switch designers often connect switch chips in multi-stage networks. For example, a Clos network is a popular paradigm, offering non-blocking operation at a low chip count. However, a Clos network can introduce significant design and implementation complexity, such as complex routing and intricate wiring.

Instead of a multi-stage network (such as a Clos network), another approach is to use a crossbar switch, which is the ultimate non-blocking network. This architecture is shown conceptually in FIG. 1, which presents a block diagram illustrating an existing port-sliced buffered crossbar switch 100. Port-sliced buffered crossbar switch 100 is sliced across its input ports 112 and output ports 116 into multiple chips 110 with buffers 114 at the crosspoints providing global port connectivity. The resulting architecture has each chip connected to only a fraction of the input ports 112 and the output ports 116, thus requiring a fraction of the aggregate switch link bandwidth. However, the full switch bisection bandwidth is required for inter-chip communication via the crossbar wires or buses. Switch input ports 112 and output ports 116 can convey electrical signals using conventional serializer/deserializer (SERDES) technology or optical signals if higher throughput is needed. In some embodiments, inter-chip communication may be enabled by an interconnect and packaging technology called proximity communication.

Proximity communication uses capacitive, inductive, magnetic, optical and/or conductive inter-chip coupling to communicate signals from one chip to another. For example, in capacitive proximity communication, capacitors may be integrated directly on the chip dies. As a consequence, chip input/output density may be improved by up to two orders of magnitude. When applied to switches, proximity communication can enable a port-sliced crossbar switch with a bisection bandwidth of tens of terabits per second and hundreds of input and output ports. As an illustration, using proximity communication, a switch with 576 10 Gb/s input-output ports can be implemented using 24 chips. Each of these chips has less than 480 Gb/s for link input/output bandwidth (which is feasible with conventional SERDES technology) and around 10 Tb/s for inter-chip communication (which is feasible with proximity communication). This architecture of a high port-count switch is attractive because there are significantly fewer chips and the performance characteristics are improved relative to many multi-stage switch implementations.

Proximity communication is one of several emerging high-speed chip interconnect technologies that have the potential to drastically change the architecture of high port-count switches. Other promising technologies include: CMOS-compatible photonics that facilitate the integration of optical links directly onto chip dies using standard cost-effective chip manufacturing processes; and chip stacking using through-silicon vias to connect multiple chips.

In contrast with port-sliced buffered crossbar switch 100, crossbar switches are traditionally used to build single-chip switches. When implementing high port-count multi-chip switch fabrics, crossbar switches have received little attention mainly because the bandwidth required for off-chip communication is expensive to realize using conventional technology.

Crossbar switches usually have input buffers at the inputs of the crossbar switch for storing information during periods of output contention. These input buffers may be located either on the same chip with the crossbar switch or off-chip if they have to accommodate many large queues. Moreover, the crossbar switch is typically configured by a central arbiter that periodically computes a bipartite match between input ports and output ports taking into consideration the fill level of input buffers. By accordingly updating the configuration of the switches at the crosspoints, the arbiter grants forwarding from the input buffers to the output ports. Convergence to a high-cardinality match and synchronization to a common clock are the prerequisites for achieving high throughput and synchronous operation. Unfortunately, it becomes increasingly difficult to maintain these prerequisites in crossbar switches with high radices.

Figure 1:
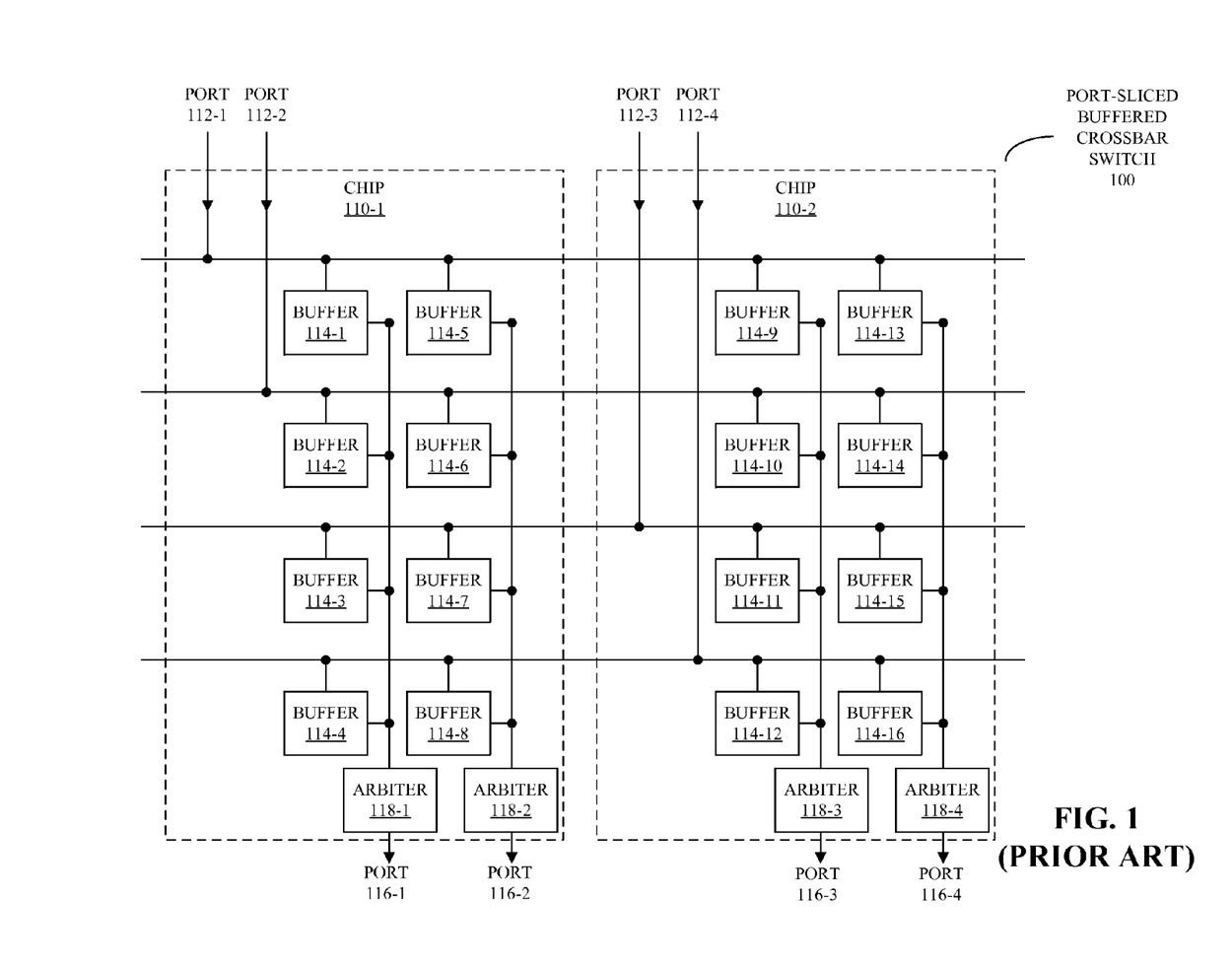
FIG. 1 is a block diagram illustrating an existing port-sliced buffered crossbar switch.

Researchers have shown that crossbar arbitration is dramatically simplified by placing shallow first-in first-out buffers (such as buffers 114) at the crosspoints. Using these buffers, data can be forwarded simultaneously from different input ports 112 to the same output port (such as output port 116-1) because it does not have to be delivered to that output port right away (instead, it can be buffered at the corresponding crosspoint). Hence, the crossbar switch can be configured by arbiters that are distributed at the crossbar switch inputs and outputs. Each input arbiter (not shown) selects an output port and grants forwarding from the input buffer to the corresponding crosspoint buffer. Symmetrically, each output arbiter selects an input port and grants forwarding from the corresponding crosspoint buffer to the output port. While the arbiters are decoupled in the short run, they are orchestrated in the longer run so that they do not over- or under-flow the crosspoint buffers. This orchestration is provided by a flow-control protocol which is used by the arbiters. Simulations have shown that small crosspoint buffers, which are capable of storing a few cells, are sufficient for excellent performance independent of switch port count. Furthermore, the crossbar input and output arbiters may operate asynchronously. Therefore, a buffered crossbar switch is appealing for implementing high port-count switches.

Flow control in buffered crossbar switches is usually credit based. If the line rate is denoted by R and the round-trip time between the input and output arbiters by RTT, crosspoint buffers 114 are usually at least RTT×R deep for the full line rate to be supported. When these arbiters are physically separated by a long distance, RTT increases accordingly. For example, with RTT equal to 680 ns and R equal to 10 Gb/s, crosspoint buffers 114 have to be at least 850 bytes deep. Assuming 32-byte cells, this translates to more than 25 cells per crosspoint, which is an excessive amount of buffering. While this waste of buffer memory resources may be tolerable for a low port-count buffered crossbar switch, it becomes an issue as port count increases, given that the number of crosspoint buffers scales with the square of the number of ports. Hence, for high port-count buffered crossbar switches, it is desirable to economize on buffer space by providing for a short RTT in the control path.

As noted previously, it may be advantageous to implement a buffered crossbar switch using a multi-chip switch with proximity communication. However, this switch architecture poses additional challenges. In particular, a multi-chip switch may introduce high off-chip communication latencies, thereby increasing RTT, and with it the buffer-space requirements. In the discussion that follows, a control and data-path organization is described which significantly reduces RTT.

If proximity communication is used in port-sliced buffered crossbar switch 100, the crossbar switch is divided by segmenting its input ports 112 and the resulting slices are mapped to separate chips 110 in a vector arrangement (in the discussion that follows, this proximity-communication-based switch organization is sometimes referred to as the base organization). Note that crossbar output ports 116, the buffers 114 that they read from, and arbiters 118 are collocated on the same chip. However, an input arbiter (not shown) may be located multiple chips away from the output arbiter depending on the relative positions of the input port and the output port.

Assuming that an input buffer is on the same chip as the corresponding input port, there is a small round-trip latency for the path between the input buffers and the same-chip crosspoint buffers 114. The resulting flow-control RTT for each crosspoint buffer can be expressed in units of chip-to-chip round-trip latencies. Consider an N×N buffered crossbar switch which is divided into a vector of M identical chips, which are labeled from 0 to M−1 counting, for example, from right to left. Moreover, R is the line rate and RTT is the chip-to-chip round-trip latency. Then, the total buffer space $B_i$ for chip i (where i is between 0 and M−1) is $$\sum_{j=0}^{i-1} \left(\frac{N}{M}\right)^2 \cdot ((i-j) \cdot RTT) \cdot R + \left(\frac{N}{M}\right)^2 \cdot \varepsilon \cdot R + \sum_{j=i+1}^{M-1} \left(\frac{N}{M}\right)^2 \cdot (j-i) \cdot RTT) \cdot R$$

where $\varepsilon$ is the propagation time from a virtual output queue at an input buffer to a given crosspoint, i.e., $O(N^2 \cdot (RTT \cdot R))$. For example, in a 6×6 buffered crossbar, which is sliced into three chips that each have a pair of input and output ports, the flow control RTT (in units of chip-to-chip round-trip latency) varies across the crossbar. If the input port is on chip zero and the output port is on chip zero, the round-trip latency is $\varepsilon$. Similarly, if the input port is on chip zero and the output port is on chip one, the round-trip latency is one, and if the input port is on chip zero and the output port is on chip two, the round-trip latency is two. This variation in the round-trip latency (and thus, the associated buffer space on each chip) is included in the preceding equation.

Figure 2:
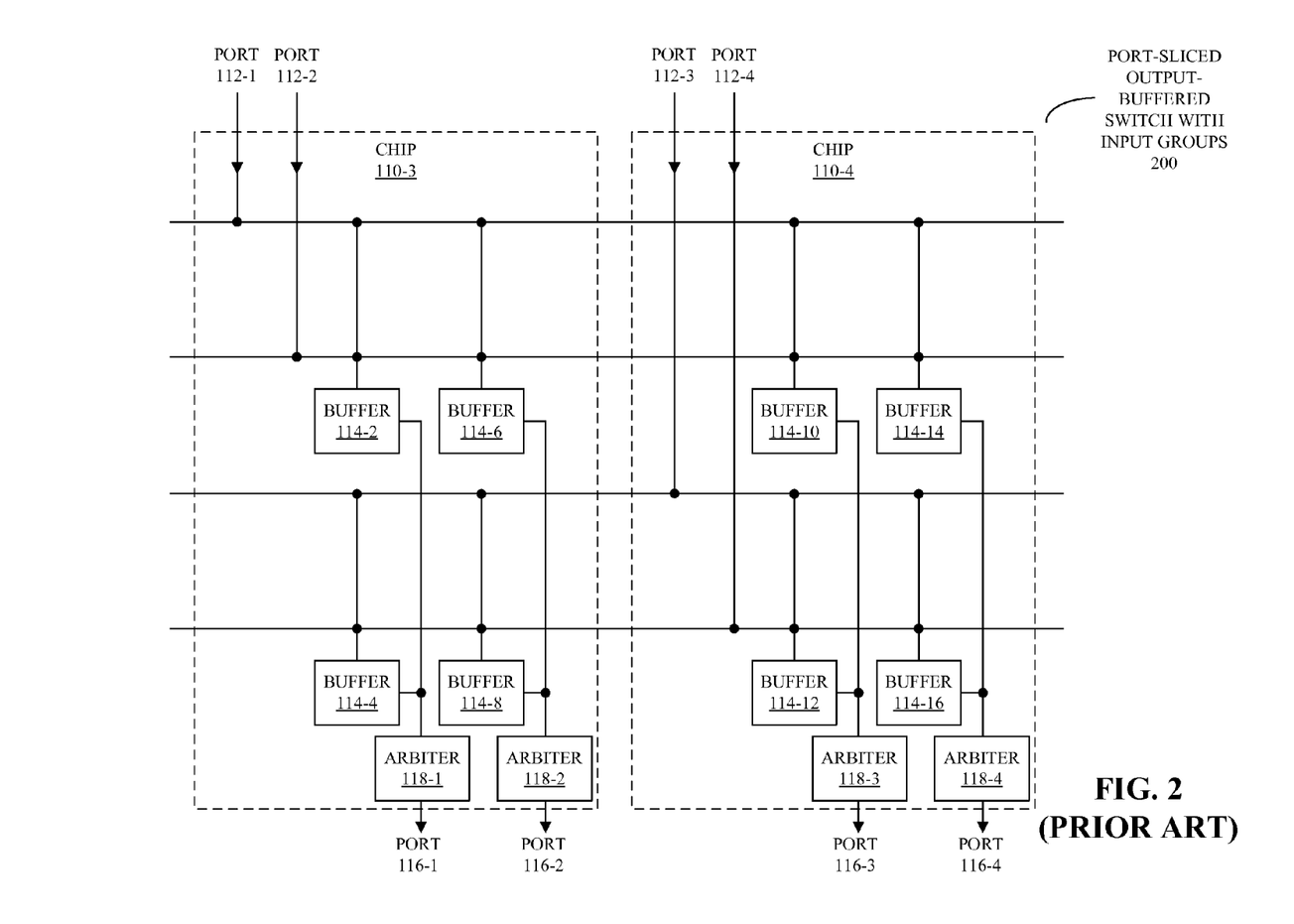
FIG. 2 is a block diagram illustrating an existing port-sliced output-buffered switch with input groups.

In order to reduce the required buffer space, a hybrid organization, called output buffered switch with input groups (OBIG), has been proposed. This is shown in FIG. 2, which presents a block diagram illustrating an existing output-buffered switch with input groups (OBIG) 200. In OBIG 200, the number of crosspoint buffers 114 is reduced. In particular, the organization of the crossbar switch remains the same as in FIG. 1, but instead of providing one buffer for each input-output pair, the same-chip inputs are grouped and one buffer is provided for each input group-output port pair. Hence, the number of buffers is reduced by a factor of M. Note that the inputs belonging to the same group are interconnected with their shared crosspoint buffers through an N/M×N sub-crossbar. A central arbiter, located on the chip containing the input group, configures the sub-crossbar based on: a) the state of the input buffers of the input group; and b) the state of the crosspoint buffers. For a), a request-grant handshake protocol may be introduced between the input buffers and the central arbiter as in traditional unbuffered crossbar switches. For b), a flow-control protocol may be deployed between the crosspoint buffers and the central arbiter. Using credit-based flow control, the crosspoint buffers may need to be dimensioned as described previously for the fully buffered case, thereby accounting for the progressively increasing distance between the output arbiters and the central arbiter. Consequently, OBIG 200 typically requires the same deep cross-point buffers as the fully buffered crossbar, but lowers the number of crosspoint buffers. This reduces the buffer space by a factor of M. Thus, the per-chip buffer space requirements for OBIG 200 grow as $O(N^2/M) \cdot (RTT \cdot R))$.

To further decrease buffer space, hop-by-hop multiplexing of the same-output crosspoint buffers is proposed. This organization reduces RTT and, with it, the buffer space. The approach may be used in a fully buffered crossbar switch and/or in OBIG 200. As an illustration, the fully buffered configuration is used in the discussion that follows.

Figure 3A:
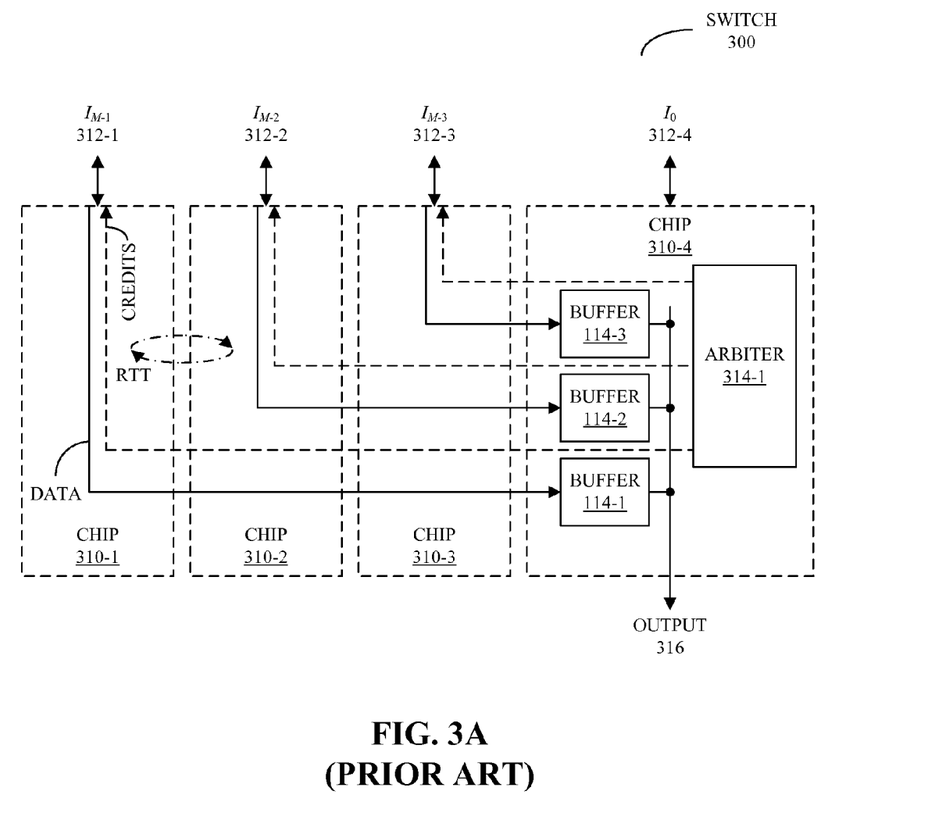
FIG. 3A is a block diagram illustrating cell multiplexing in switches in accordance with FIG. 1 and FIG. 2.

We now more extensively describe why the base organization operates with unnecessarily long RTTs. Consider a single output and M inputs ($I_{M-1}$ 312-1, $I_{M-2}$ 312-2, ..., $I_0$ 312-4), as shown in FIG. 3A. Furthermore, consider two active flows in switch 300 (where a flow is defined by a switch input-output pair), flow $F_{M-1}$ originating from input $I_{M-1}$ 312-1 on chip 310-1 and flow $F_{M-2}$ originating from $I_{M-2}$ 312-2 on chip 310-2. The control loops for flows $F_{M-1}$ and $F_{M-2}$ end on the chip containing output 316. Their lengths are M×RTT and (M−1)×RTT, respectively, at buffers 114-1 and 114-2. Taking into consideration the flow control loops for the rest of the buffers as well, we conclude that the buffer space needed for the output grows as $O(M^2 \cdot (RTT \cdot R))$. However, considering that the above flows $F_{M-1}$ and $F_{M-2}$ originate from neighboring inputs, their data paths could be merged much earlier at the chip containing the input $I_{M-2}$ 312-2. Thus, rather than having M separate data paths which are multiplexed close to the output, it should be preferable to have one shared path split up into M−1 points of multiplexing which are located close to the inputs.

Figure 3B:
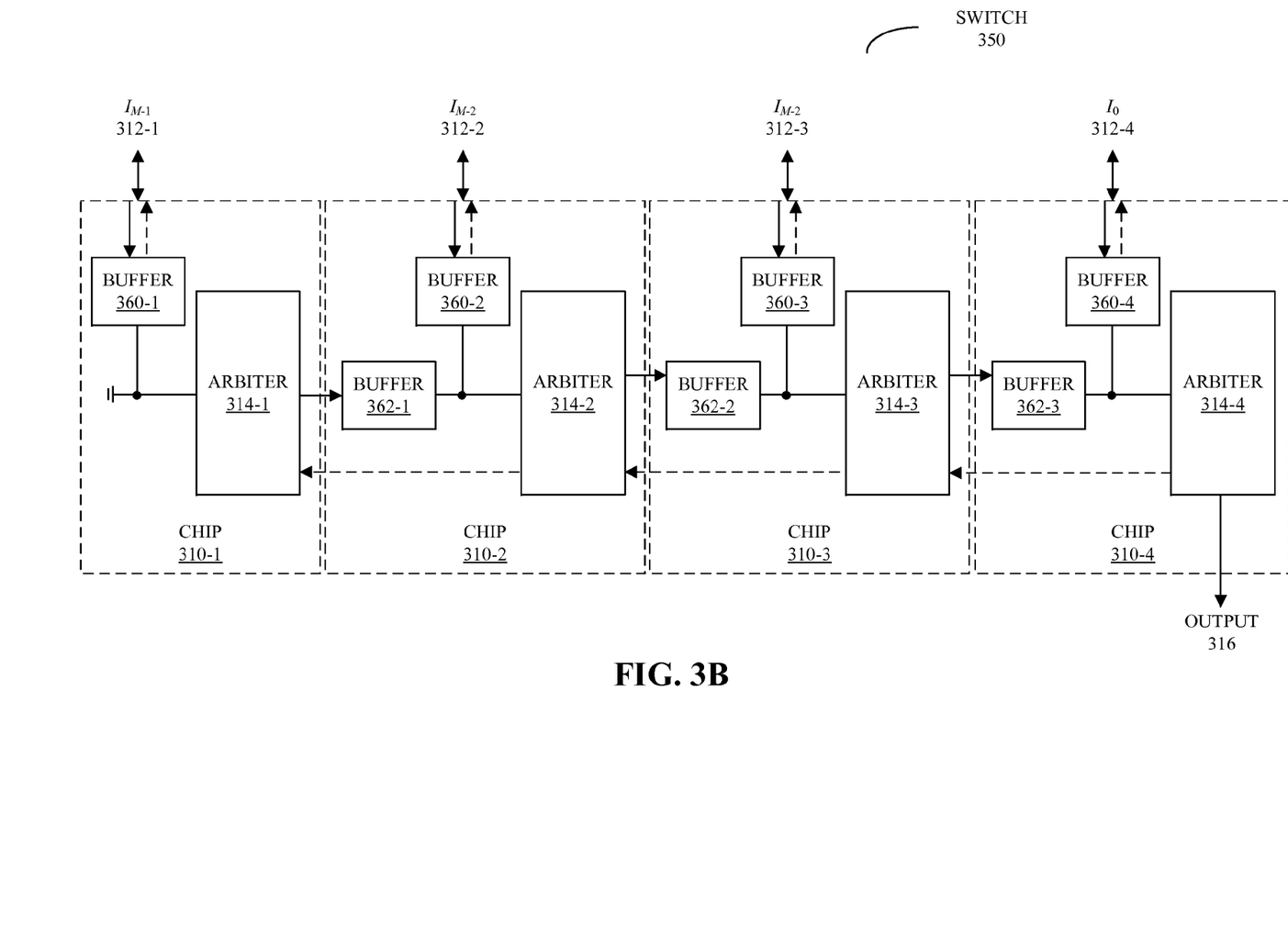
FIG. 3B is a block diagram illustrating cell multiplexing in a switch in accordance with an embodiment of the present invention.

FIG. 3B shows how to multiplex the flows of switch 300 (FIG. 3A) utilizing this idea. One crosspoint buffer (such as buffer 360-1) is provided for each input-output pair. This crosspoint buffer is placed on the chip containing the corresponding input rather than on the chip with output 316. Chain buffers 362 are coupled in a chain along a bus with one first-in first-out buffer per chip. Each chip has one of arbiters 314, which decides whether the corresponding one of the chain buffers 362 or the crosspoint buffers 360 is served, and accordingly multiplexes and forwards the appropriate cells to the chain buffer in the next downstream chip toward output 316. Note that the chain buffers 362 are prevented from overflowing using chip-by-chip credit flow control. Also note that the depth of the crosspoint buffers 360 does not depend on RTT, while it is sufficient if the chain buffers 362 are one RTT deep. In contrast with switch 300 (FIG. 3A), the total buffer space for output 316 drops from $O(M^2 \cdot RTT \cdot R)$ to $O(M \cdot (RTT \cdot R))$.

If arbitration on each chip implements a plain round-robin technique, the bandwidth of output 316 is allocated to the flows based on the topological location of their inputs. That is, the closer an input is to output 316, the more bandwidth the flow gets. This problem is traditionally called the parking lot problem due to its analogy to a crowded parking lot with one exit.

Figure 4A:
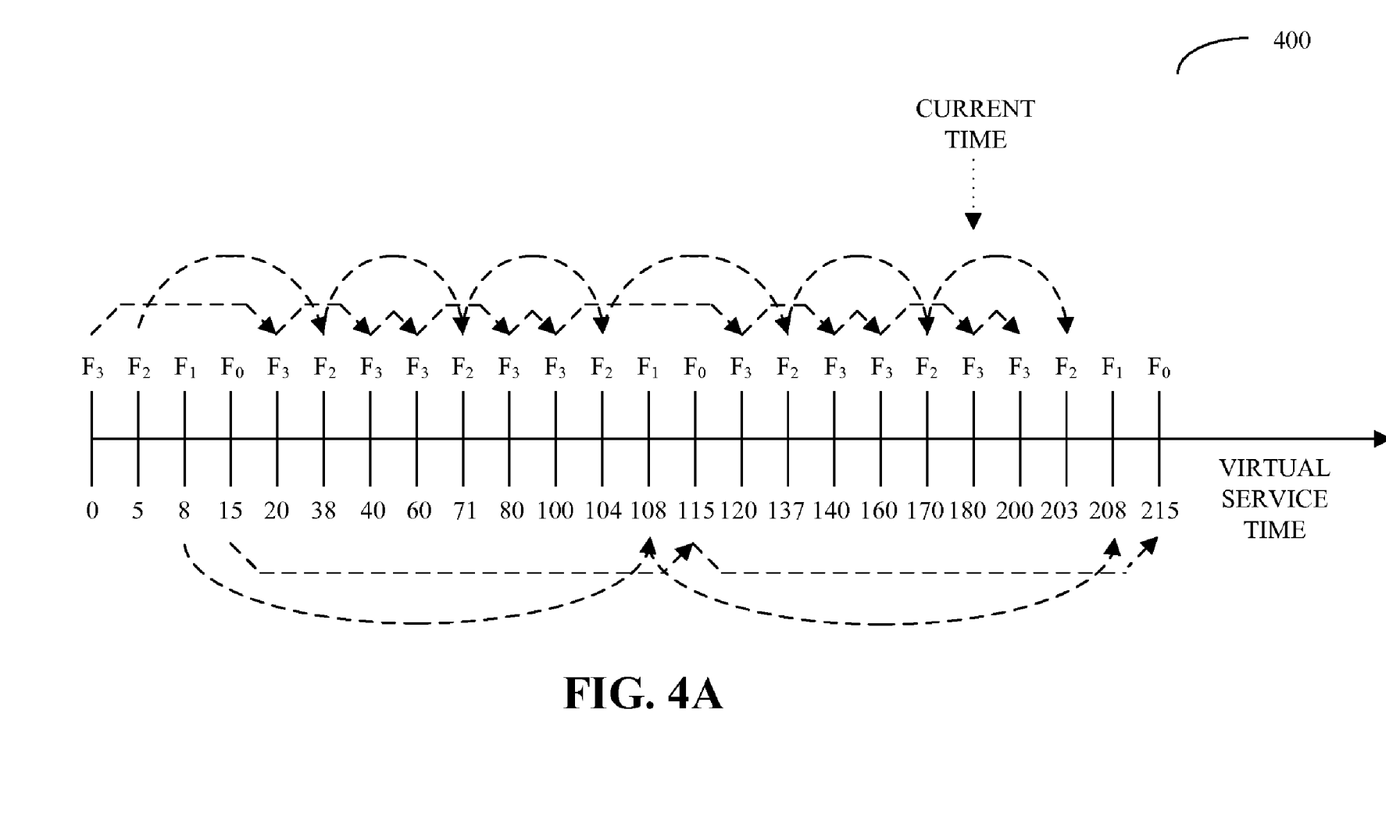
FIG. 4A is a timing diagram illustrating a weighted round-robin arbitration technique in accordance with an embodiment of the present invention.

We now describe how to provide (weighted) fairness among the flows using a distributed weighted round-robin arbitration technique. This is shown in FIG. 4A, which presents a timing diagram 400 illustrating a weighted round-robin arbitration technique. In FIG. 4A, four flows are shown with their weight configuration competing for the bandwidth of the output. Each flow is assigned a virtual service time which is inversely proportional to the weight of that flow. (Note that the weights may be assigned by software or control logic external to the switch and then communicated to the arbiters in headers associated with the cells in the flows.) In this example, flow $F_0$ has a weight of 10 (and an interval of 100), flow $F_1$ has a weight of 10 (and an interval of 100), flow $F_2$ has a weight of 30 (and an interval of 33) and flow $F_3$ has a weight of 50 (and an interval of 20). For each cell time, the arbiter chooses the flow with the earliest service time. Once served, the flow is rescheduled and given a future service time based, at least in part, on the interval for the flow. For example, flow $F_3$ may be served at virtual service time 180 and rescheduled for service at virtual service time 200.

Figure 4B:
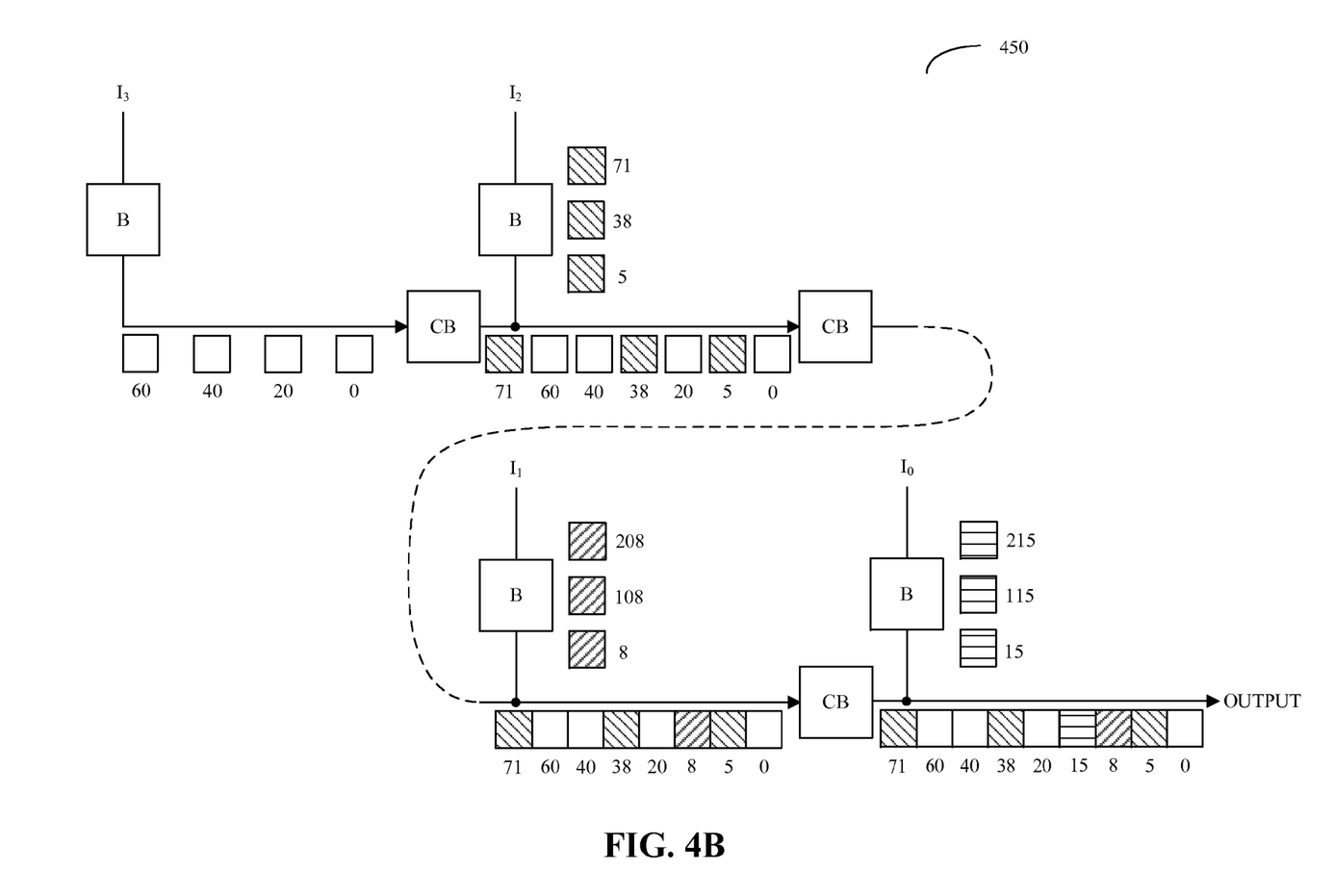
FIG. 4B is a block diagram illustrating the weighted round-robin arbitration technique of FIG. 4A in a distributed queue in accordance with an embodiment of the present invention.

FIG. 4B presents a block diagram 450 illustrating the weighted round-robin arbitration technique of FIG. 4A in a distributed queue, such as the distributed buffering and multiplexing organization described previously. Each input has a local virtual time counter (which is specific to a given chip) and provides virtual time stamps as explained above. For example, three cells from input $I_2$ may be assigned local virtual time stamps of 5, 38 and 71. In FIG. 4B, cells carry their stamp in their header. For each cell time, the arbiter in a given chip examines the head of the chain buffer (CB) and crosspoint buffer (B), selects the cell with the earliest service time, and forwards it to the next chain buffer toward the output. In this way, the cells are sorted with ascending service times and bandwidth is allocated to flows in proportion to their weight.

In order to illustrate the need for synchronization of the local virtual time counters, consider in the example of FIG. 4B that input $I_3$ is idle while the inputs $I_2$, $I_1$ and $I_0$ are congesting the output. If input $I_3$ suddenly becomes active after inputs $I_2$, $I_1$ and $I_0$ have advanced their local virtual time considerably, input $I_3$ will be given the highest priority until its local virtual time exceeds the local virtual time of at least one of the other inputs. This problem is analogous to the flow re-insertion problem in traditional weighted round-robin techniques: when a flow transitions from inactive to active, its service time should be inserted ahead of the service time of the flow last served. Otherwise, if inserted in the past (e.g., after the service time the flow was last active and before the current virtual times of the other inputs), it is as if the flow banks some capacity for future use. This problem is not trivial to solve in the present example because there is no notion of 'central' virtual time. In particular, when a flow becomes active, its input has no knowledge of when the last flow was served and the corresponding value of the virtual time.

To resolve this problem, it is assumed that each chip maintains a virtual time pointer, named $vtime_{curr}$, which points to the virtual time a flow was last served on that chip. If the virtual-time stamp of a cell (vtime) in the flow stream originating from the local input appears smaller than $vtime_{curr}$, the virtual-time stamp of that cell and subsequent cells belonging to the same flow are offset by the difference $vtime_{curr}-vtime$. Furthermore, if any of the offset stamps in the flow streams appear smaller than $vtime_{curr}$, a new offset is calculated. This same technique is also applied to the flow aggregate appearing in the chain buffer. Table 1 provides pseudo-code for this technique. Note that actually this technique intends to create a flow aggregate at each chip so that all flows are brought ahead of the current local virtual time. Hence, at the next chip toward the output, it suffices to shift the virtual times of all cells in the flow aggregate by the same virtual time interval, which is specified as described above.

TABLE 1

```
DEQUEUEING MODULE( )
while TRUE do
   if crosspoint buffer B or chain buffer CB is non empty then
      - get B or CB with minimum stamped head.
      - dequeue cell from selected buffer.
      vtime_curr = cell → vtime
      return cell
   end if
end while
ENQUEUEING MODULE(cell, buf_id)
if buf_id = B then
   if cell → vtime < vtime_curr then
      if cell → vtime + offset_B < vtime_curr then
         offset_B = vtime_curr − cell → vtime
         cell → vtime = vtime_curr
      else
         cell → vtime = cell → vtime + offset_B
      end if
   end if
   - enqueue cell to buffer B.
else if buf_id = CB then
   /* similarly for chain buffer */
end if
```

Figure 5:
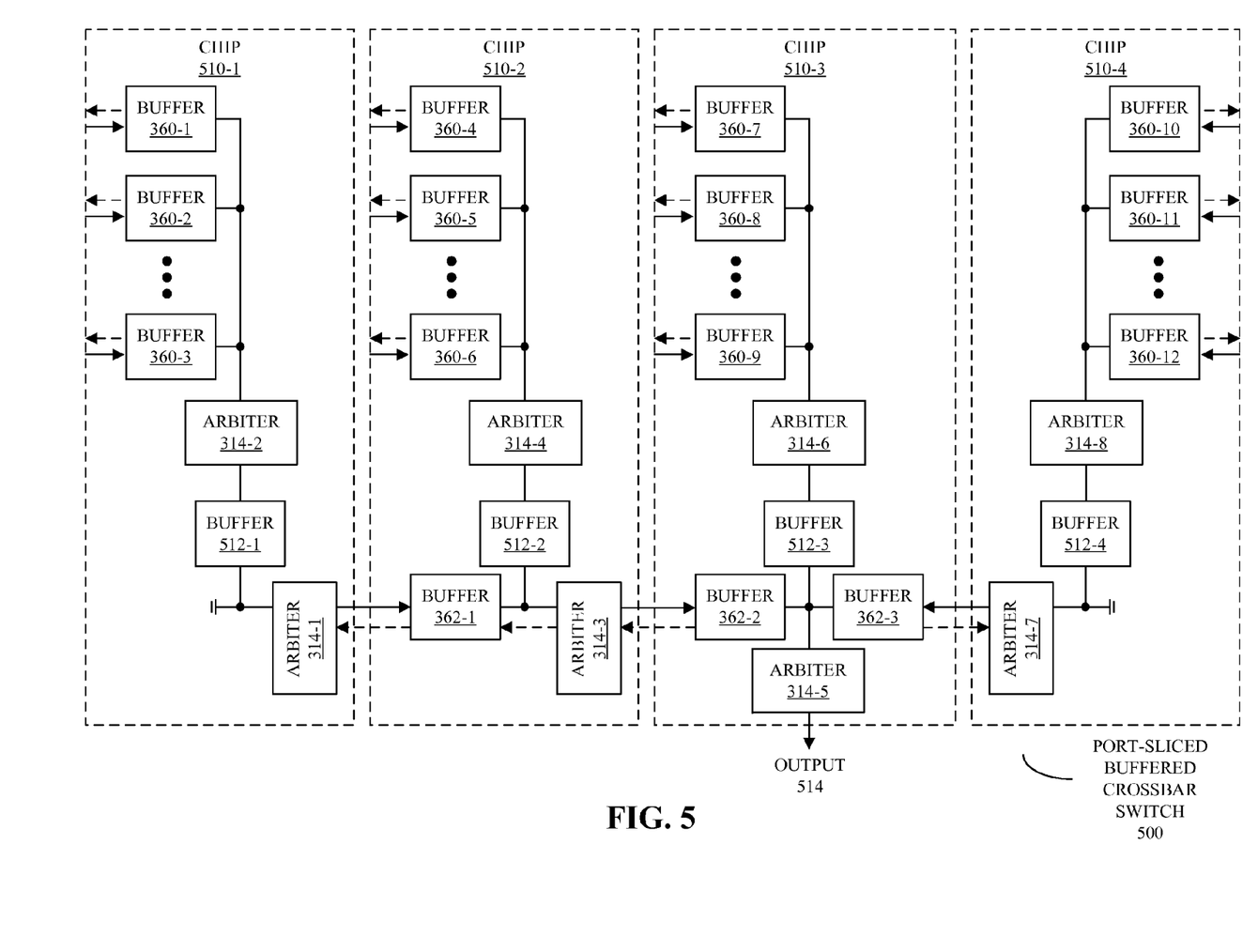
FIG. 5 is a block diagram illustrating the data path of a single output of a port-sliced buffered crossbar switch in accordance with an embodiment of the present invention.

In order to use the distributed weighted round-robin arbitration technique in a proximity-communication-based switch, it needs to be extended so that it operates with: a) a group of inputs per chip; and b) any position of the output with respect to the inputs, not just outputs located in the outermost chips. This is illustrated in FIG. 5, which presents a block diagram illustrating a port-sliced crossbar switch 500 with multiple chips 510. To address a), the arbitration is divided into two levels. In the first level (such as arbiters 314-2, 314-4, 314-6 and 314-8), contention between the inputs of the same group is resolved using a conventional weighted round-robin arbiter. In the second level (such as arbiters 314-1, 314-3, 314-5 and 314-7), contention between groups of inputs is resolved using the distributed weighted round-robin arbitration technique described above. Note that small buffers 512, which are called hierarchy buffers, decouple the two levels of arbitration. In addition, flow control between chips 510 may be implemented by chain buffers 362 sending flow-control information to arbiters 314, thereby informing arbiters 314 whether chain buffers 362 have space for additional cells. While note labeled in FIG. 5, there are data in put ports and control output ports in each of the slices in port-sliced crossbar switch 500.

To address b), it is assumed that when the output is located in between the chips containing the inputs, there are two separate chains of buffers. In this case, the second-level arbiter (such as arbiter 314-5) next to output 514 multiplexes cells originating from local hierarchy buffer 512-3 and chain buffers 362-2 and 362-3 to the right and left of the output (these multiplexers are illustrated in FIG. 6 below).

Figure 6:
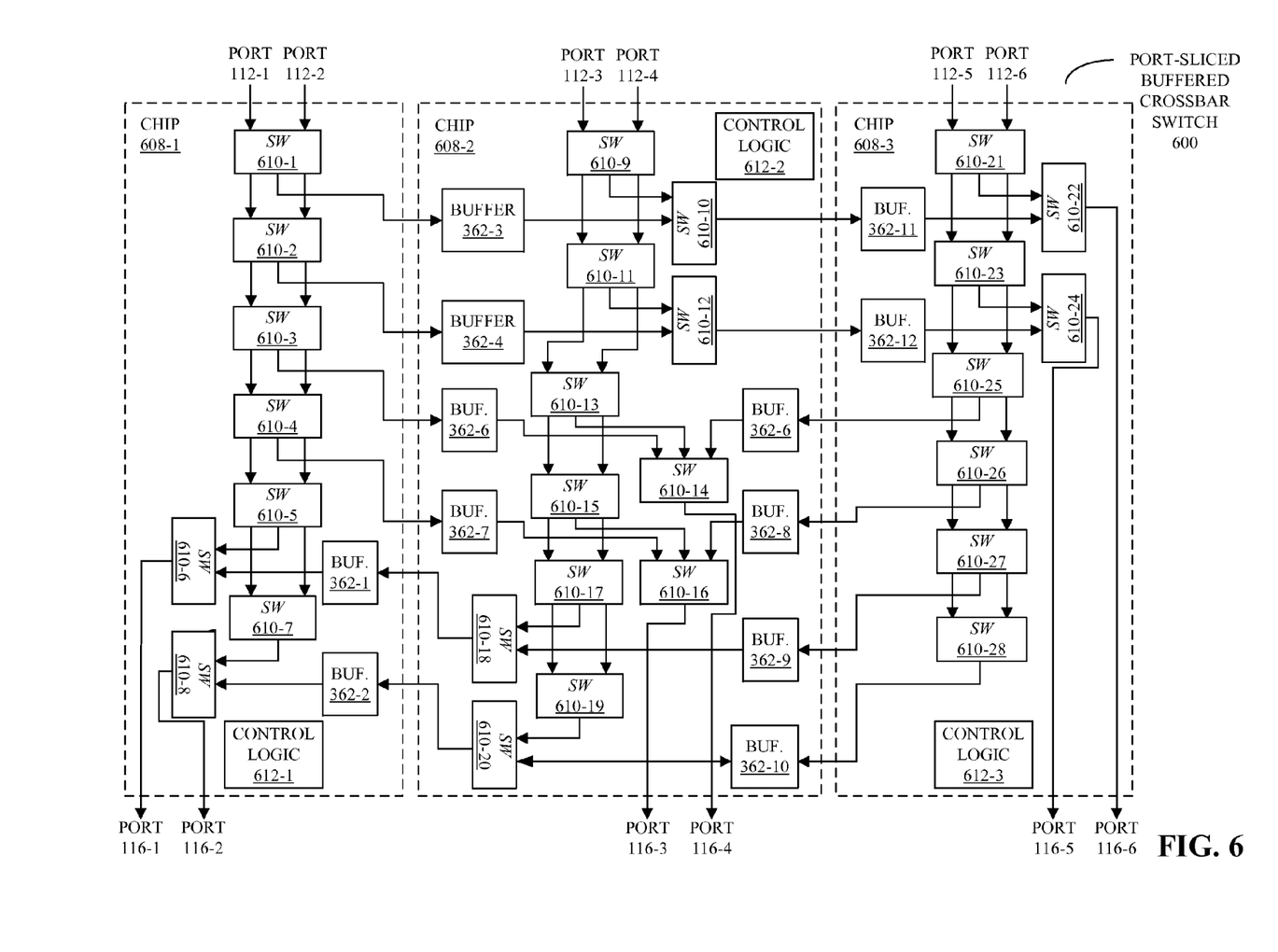
FIG. 6 is a block diagram illustrating a port-sliced buffered crossbar switch in accordance with an embodiment of the present invention.

A new switch organization results from replicating the technique illustrated in FIG. 6 for each output. For a vector switch with a port count of 6 built up by switch slices with a port count of 2, each slice implements a 2×6 buffered crossbar switch (such as SW 610-1, 610-2, 610-3, 610-4, 610-5, 10-7, each of which includes crosspoint buffers 360, hierarchy buffers 512 and arbiter 314 as shown in FIG. 5), and outputs from chips 510 are served using the technique illustrated in FIG. 5. Note that the number of inter-chip wires or buses will be the same as in FIGS. 1 and 2, which indicates the same inter-chip communication throughput.

Repeating the calculation of the total buffer space for the base organization using these techniques, consider a vector switch with N input-output ports built up by M slices. Then, each chip requires: i) $N^2/M$ crosspoint buffers 360 for the N/M×N buffered crossbar switch; ii) N hierarchy buffers 512; and iii) N+N/M chain buffers 362. (Note that these totals include N−N/M chain buffers 362 for through traffic plus 2·(N/M) chain buffers 362 for traffic destined for a given chip.) The crosspoint buffers 360 and hierarchy buffers 512 do not depend on RTT, while the chain buffers 362 are at least RTT×R deep. Hence, each chip requires a total buffer space of $$\left(\frac{N^2}{M}+N\right)\cdot\varepsilon\cdot R+\left(N+\frac{N}{M}\right)\cdot RTT\cdot R.$$

The buffer space for each chip grows as O(N·(RTT·R)), i.e., N times slower than the organization of FIG. 1.

Hybrid architectures, such as OBIG 200 (FIG. 2), may also benefit from this switch organization. For example, replacing each N/M×N buffered crossbar in the above organization with an unbuffered crossbar and a central arbiter, results in an architecture similar to OBIG 200 (FIG. 2) but with considerable buffer savings. In particular, buffer space per chip grows as O(N·(RTT·R)), which is N/M slower than in the organization of FIG. 2.

Note that the new switch organization introduces latency overhead incurred by buffering, arbitration and multiplexing in each chip of the vector. It is expected that buffering, arbitration and multiplexing can be performed in a single clock cycle, which is very small compared to the inter-chip communication latency. Hence, it is expected that this technique will introduce negligible latency overhead. Furthermore, note that some of the latency overhead associated with chain buffers 362 can be subsumed when combining these buffers with the elastic buffers needed when data is forwarded from one chip to another.

Additionally, the new switch organization can operate with the chain buffers 362 and hierarchy buffers 512 (FIG. 5) being smaller than the switched cells, provided that the chain buffers 362 are at least one RTT worth of data deep. Then, a cell may be spread across multiple buffers and the arbiters have to ensure that a cell has been forwarded completely from the served buffer before servicing the next one. Note that this operation resembles wormhole switching.

In some embodiments, the buffers can be used as elastic pipelines. For example, by implementing the chain buffers 362 with dual-port SRAMs, these buffers can be utilized as asynchronous first-in first-out buffers forming a clock boundary between synchronous blocks operating in separate clock domains.

Furthermore, the input buffers in the port-sliced crossbar switch may be located at a variety of positions. In order to facilitate tight integration, the input buffers may be placed on the same chips as the crossbar logic. In this regard, note that the queueing organization of the input buffers can significantly impact overall performance. For example, providing a single queue per input buffer leads to the well-known head-of-line blocking problem. While virtual output queueing is an organization that eliminates head-of-line blocking by providing one queue per switch output port, it is rather expensive or infeasible to implement virtual output queueing for a high port-count switch. One solution may be to use a limited number of queues (lanes) per input buffer. Moreover, the queues may be allocated to flows based on a congestion management technique.

An exemplary embodiment of the port-sliced buffered crossbar switch includes: a vector with a port count of 256, a chip with a port count of 32, an arbitration time of one cycle, a chip-to-chip propagation time of 14 cycles, a propagation time ∈ from a virtual output queue at an input buffer to a crosspoint of one cycle, a propagation time from a crosspoint to a hierarchy buffer of a fraction of a cycle, a crosspoint buffer space of four cells, a hierarchy buffer space of two cells, and a chain buffer space of 30 cells.

In event-driven simulations (not shown), the performance of the distributed weighted round-robin technique was evaluated with respect to its fairness properties and its impact on the throughput of the proximity-communication switch. These simulations indicate that each flow received its fair share of the bandwidth of the output and that unused bandwidth was allocated to flows according to their weight.

Under feasible uniform traffic conditions, the delay curves for the port-sliced buffered crossbar switch had a constant delay shift compared to the delay for the port-sliced buffered crossbar switch with the base organization. This additional latency is associated with the extra arbiters added in the buffered chain and could be removed by resorting to pipelining in that arbitration takes place one cycle before the arrival of the data. After correcting for this constant shift, the performance was the same as the port-sliced buffered crossbar switch with the base organization. Thus, there is no performance degradation in the port-sliced buffered crossbar switch with the new organization even though there are significant buffer-space savings.

In the preceding embodiments there may be fewer components or additional components. Furthermore, two or more components may be combined into a single component and/or the position of one or more components may be changed.

Figure 7:
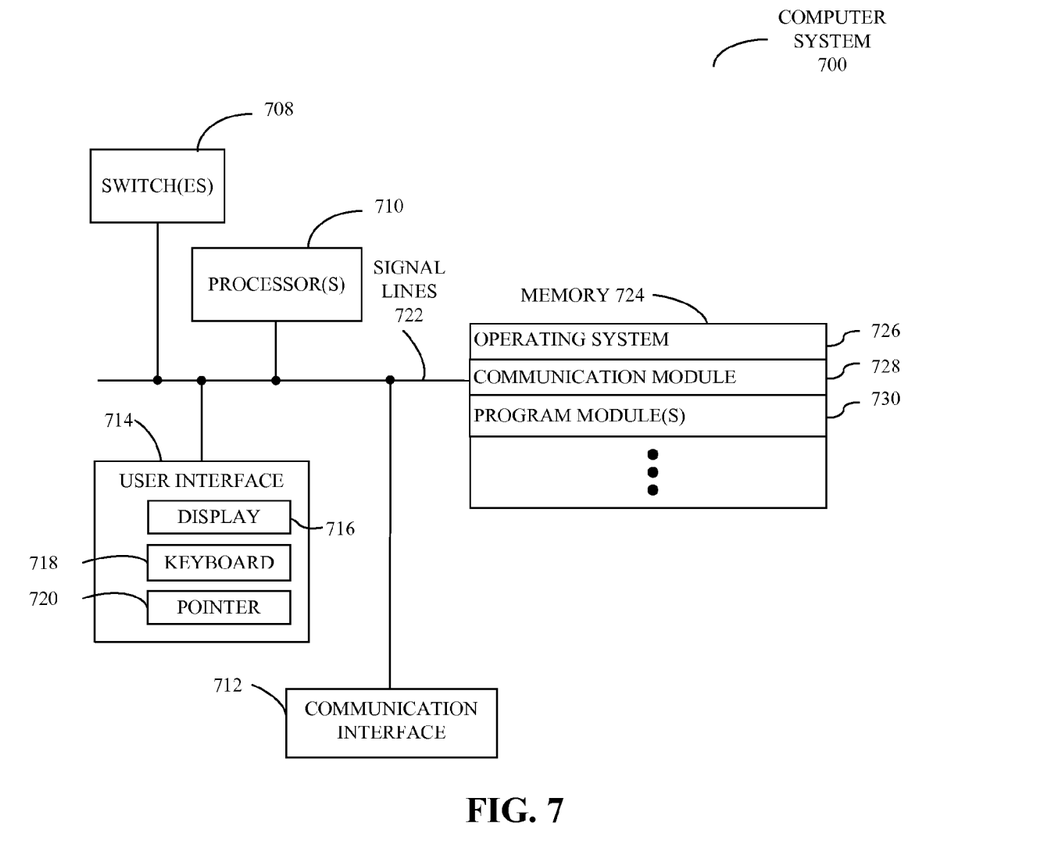
FIG. 7 is a block diagram illustrating a computer system in accordance with an embodiment of the present invention.

We now describe embodiments of a computer system that includes one or more of the switches. FIG. 7 presents a block diagram illustrating a computer system 700, which includes: one or more processors 710, a communication interface 712, a user interface 714, and one or more signal lines 722 coupling these components together. Note that the one or more processing units 710 may support parallel processing and/or multi-threaded operation, the communication interface 712 may have a persistent communication connection, and the one or more signal lines 722 may constitute a communication bus. Moreover, the user interface 714 may include: a display 716, a keyboard 718, and/or a pointer, such as a mouse 720.

Computer system 700 may include memory 724, which may include high speed random access memory and/or non-volatile memory. More specifically, memory 724 may include ROM, RAM, EPROM, EEPROM, flash, one or more smart cards, one or more magnetic disc storage devices, and/or one or more optical storage devices. Memory 724 may store an operating system 726 that includes procedures (or a set of instructions) for handling various basic system services for performing hardware-dependent tasks. Moreover, memory 724 may also store communications procedures (or a set of instructions) in a communication module 728. These communication procedures may be used for communicating with one or more computers, devices and/or servers, including computers, devices and/or servers that are remotely located with respect to the computer system 700.

Memory 724 may also include one or more program modules (or a set of instructions) 730. Instructions in the program modules 730 in the memory 724 may be implemented in a high-level procedural language, an object-oriented programming language, and/or in an assembly or machine language. The programming language may be compiled or interpreted, i.e., configurable or configured, to be executed by the one or more processing units 710.

Computer system 700 may include one or more switches 708 that include the port-sliced buffered crossbar switch described in the previous embodiments.

Computer system 700 may include fewer components or additional components, two or more components may be combined into a single component, and/or a position of one or more components may be changed. In some embodiments, the functionality of the computer system 700 may be implemented more in hardware and less in software, or less in hardware and more in software, as is known in the art. For example, some or all of the functionality of the computer system 700 may be implemented in one or more application specific integrated circuits (ASICs) and/or one or more digital signal processors (DSPs).

Although the computer system 700 is illustrated as having a number of discrete items, FIG. 7 is intended to be a functional description of the various features that may be present in the computer system 700 rather than a structural schematic of the embodiments described herein. In practice, and as recognized by those of ordinary skill in the art, the functions of the computer system 700 may be distributed over a large number of servers or computers, with various groups of the servers or computers performing particular subsets of the functions. For example, one or more switches 708 may be included in a computer system which is at one location or which is distributed over multiple, geographically dispersed locations. Consequently, instructions and/or data associated with processes or jobs that are executed by the computer system may be received and communicated within the computer system over a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

Additionally, note that one or more switches 708 may be used in a variety of applications, including: data centers, networks, and/or computer systems (such as multi-processor computer systems). For example, the switches may be included in a backplane that is coupled to multiple processor blades, or the switch may couple different types of components (such as: processors, memory, input/output devices, and/or peripheral devices). These switches may also perform the functions of: a hub, a bridge, and/or a router. Furthermore, switches 708 may operate at one or more layers in the open systems interconnection reference model, such as the physical layer (layer 1), the data link layer (layer 2), and/or the network layer (layer 3). Thus, in some embodiments switches 708 include a multi-layer switch.

While the preceding discussion used a multi-chip switch as an illustration, the distributed-buffering technique and/or distributed weighted round-robin arbitration may be used in a variety of switch architectures, including single-chip tiled architectures. In this case, latency may be reduced by merging the chain buffers with wire pipeline registers where one clock cycle is lost anyway. Furthermore, these circuits and techniques may also be used for on-chip interconnects, such as those used for networks on chip and tiled architectures.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A circuit to selectively couple input nodes to at least one output node, comprising:
   groups of input nodes configured to receive input signals;
   at least one unidirectional bus, having a scalable bus length, which is coupled to the at least one output node;
   buffers arranged along the bus, including chain buffers configured to buffer data signals on the bus and crosspoint buffers configured to buffer the input signals from the group of input nodes, wherein a depth of a given chain buffer is independent of the bus length;
   arbiter circuits distributed along the bus, wherein a given arbiter circuit arbitrates between the data signals input to a given chain buffer and one or more of the input signals input to a given crosspoint buffer;
   multiplexers, wherein a given multiplexer is coupled to a given chain buffer, a given crosspoint buffer and either the bus or, for a last multiplexer, the at least one output node; and
   wherein the given multiplexer is configured to selectively couple inputs to the given multiplexer, which include one or more of the input signals and data signals output from a chain buffer on the bus, to either a subsequent chain buffer on the bus or, for the last multiplexer on the bus, the at least one output node.

2. The circuit of claim 1, wherein one or more of the crosspoint buffers receives two or more of the input signals from two or more input nodes in the group of input nodes.

3. The circuit of claim 1, further comprising flow-control circuits, wherein a given flow-control circuit is configured to determine if one or more downstream buffers on the bus can accept data.

4. The circuit of claim 1, wherein the depth of the given chain buffer corresponds to the length of segment of the bus which couples the given chain buffer to a preceding chain buffer; and
wherein flow-control information is sent from the given chain buffer to an arbiter associated with the preceding chain buffer that indicates whether the given chain buffer has space for additional data packets associated with the data signals.

5. The circuit of claim 4, wherein the circuit is implemented using multiple chips;
wherein the chain buffer and the preceding chain buffer are located on different chips;
wherein the segment of the bus includes a signal path external to the chips.

6. The circuit of claim 1, wherein the circuit is implemented using multiple chips; and
wherein a given chip includes a subset of the group of input nodes, the given chain buffer, the given crosspoint buffer, the given arbiter circuit and the given multiplexer.

7. The circuit of claim 6, wherein the given arbiter circuit arbitrates between the subset of the group of input signals and data signals output from adjacent chips in the circuit.

8. The circuit of claim 6, wherein adjacent chips in the multiple chips communicate via proximity communication.

9. The circuit of claim 1, wherein the arbiter circuits use a round-robin technique to ensure fairness between the inputs to the multiplexers.

10. The circuit of claim 1, wherein the arbiter circuits use a distributed weighted round-robin technique; and
wherein weights for a given flow through the circuit, which includes one or more of the input signals, are provided to the circuit.

11. The circuit of claim 10, wherein the given arbiter circuit arbitrates between different data packets associated with the data signals in the given chain buffer and data packets associated with the one or more input signals in the given crosspoint buffer using virtual time stamps which determine the service virtual time of the different data packets on the bus.

12. The circuit of claim 11, wherein a data packet with the earliest service virtual time is forwarded first.

13. The circuit of claim 11, wherein the virtual time stamps are computed locally based on a given weight associated with the given flow through the circuit and a value of a local virtual-time clock.

14. The circuit of claim 13, wherein the value of the local virtual-time clock is updated according to virtual time stamps of data packets associated with the data signals that are received in a given chain buffer and data packets associated with the input signals that are received in the given crosspoint buffer.

15. The circuit of claim 1, wherein the circuit comprises a switch to selectively couple input nodes to the at least one output node.

16. A switch to selectively couple input nodes to at least one output node, comprising:

groups of input nodes configured to receive input signals;
at least one unidirectional bus, having a scalable bus length, which is coupled to the at least one output node;
buffers arranged along the bus, including chain buffers configured to buffer data signals on the bus and crosspoint buffers configured to buffer the input signals from the group of input nodes, wherein a depth of a given chain buffer is independent of the bus length;
arbiter circuits distributed along the bus, wherein a given arbiter circuit arbitrates between the data signals input to a given chain buffer and one or more of the input signals input to a given crosspoint buffer;
multiplexers, wherein a given multiplexer is coupled to a given chain buffer, a given crosspoint buffer and either the bus or, for a last multiplexer, the at least one output node; and
wherein the given multiplexer is configured to selectively couple inputs to the given multiplexer, which include one or more of the input signals and data signals output from a chain buffer on the bus, to either a subsequent chain buffer on the bus or, for the last multiplexer on the bus, the at least one output node.

17. The switch of claim 16, wherein the circuit is implemented using multiple chips; and
wherein a given chip includes a subset of the given group of input nodes, the given chain buffer, the given crosspoint buffer, the given arbiter circuit and the given multiplexer.

18. The switch of claim 16, wherein one or more busses in the switch are configured to communicate a full bisectional bandwidth in the switch, which includes a bandwidth associated with an aggregation of all of the input signals.

19. The switch of claim 16, further comprising flow-control circuits, wherein a given flow-control circuit is configured to determine if one or more downstream buffers on the bus can accept data.

20. A computer system, comprising a switch to selectively couple input nodes to at least one output node, wherein the switch includes:

groups of input nodes configured to receive input signals;
at least one unidirectional bus, having a scalable bus length, which is coupled to the at least one output node;
buffers arranged along the bus, including chain buffers configured to buffer data signals on the bus and crosspoint buffers configured to buffer the input signals from the group of input nodes, wherein a depth of a given chain buffer is independent of the bus length;
arbiter circuits distributed along the bus, wherein a given arbiter circuit arbitrates between the data signals input to a given chain buffer and one or more of the input signals input to a given crosspoint buffer;
multiplexers, wherein a given multiplexer is coupled to a given chain buffer, a given crosspoint buffer and either the bus or, for a last multiplexer, the at least one output node; and
wherein the given multiplexer is configured to selectively couple inputs to the given multiplexer, which include one or more of the input signals and data signals output from a chain buffer on the bus, to either a subsequent chain buffer on the bus or, for the last multiplexer on the bus, the at least one output node.

* * * * *